United States Patent
Maekawa et al.

(10) Patent No.: US 7,234,805 B2
(45) Date of Patent: *Jun. 26, 2007

(54) INKJET RECORDING INK FOR SUBLIMATION TRANSFER AND METHOD OF DYEING

(75) Inventors: Shunji Maekawa, Wakayama (JP); Hiroki Tanaka, Wakayama (JP)

(73) Assignee: Kiwa Chemical Industry Co., Ltd., Wakayama-shi (JP)

( * ) Notice: Subject to any disclaimer, the term of this patent is extended or adjusted under 35 U.S.C. 154(b) by 232 days.

This patent is subject to a terminal disclaimer.

(21) Appl. No.: 10/500,289

(22) PCT Filed: Aug. 14, 2003

(86) PCT No.: PCT/JP03/10362

§ 371 (c)(1), (2), (4) Date: Jun. 29, 2004

(87) PCT Pub. No.: WO2004/020537

PCT Pub. Date: Mar. 11, 2004

(65) Prior Publication Data

US 2005/0036019 A1     Feb. 17, 2005

(30) Foreign Application Priority Data

Aug. 27, 2002 (JP) ............................. 2002-247743

(51) Int. Cl.
G01D 11/00 (2006.01)

(52) U.S. Cl. .................. 347/100; 347/95; 523/160

(58) Field of Classification Search ............... 347/100, 347/101, 102, 95, 96, 103; 106/31.27, 31.13, 106/31.6; 523/160
See application file for complete search history.

(56) References Cited

U.S. PATENT DOCUMENTS

| | | | | |
|---|---|---|---|---|
| 4,205,991 | A | 6/1980 | Becker et al. | 106/22 |
| 5,122,187 | A | 6/1992 | Schwarz et al. | |
| 5,484,475 | A * | 1/1996 | Breton et al. | 347/100 |
| 5,488,907 | A | 2/1996 | Xu et al. | 101/488 |
| 5,593,486 | A | 1/1997 | Oliver et al. | |
| 5,623,296 | A | 4/1997 | Fujino et al. | |
| 5,830,263 | A | 11/1998 | Hale et al. | 106/31.27 |
| 6,607,565 | B1 * | 8/2003 | Herrmann et al. | 8/557 |
| 6,652,087 | B2 | 11/2003 | Furukawa | 347/101 |
| 6,770,331 | B1 | 8/2004 | Mielke et al. | |
| 2001/0000054 | A1 | 3/2001 | Maeda et al. | |
| 2002/0050221 | A1 | 5/2002 | Xu et al. | |

FOREIGN PATENT DOCUMENTS

| | | |
|---|---|---|
| EP | 0 739 957 A1 | 10/1996 |
| EP | 739957 | 10/1996 |
| EP | 1174436 | 1/2002 |
| GB | 2 221 916 A | 2/1990 |
| JP | 54-74105 | 6/1979 |
| JP | 54-74105 A | 6/1979 |
| JP | 57-57762 A | 4/1982 |
| JP | 59-4665 A | 1/1984 |
| JP | 60-072968 A | 4/1985 |
| JP | 62-101672 A | 5/1987 |
| JP | 2-214785 A | 8/1990 |
| JP | 2000-265098 A | 9/2000 |
| JP | 2000-351924 | 12/2000 |
| JP | 2001-115070 A | 4/2001 |
| JP | 2001-226617 | 8/2001 |
| JP | 2001-329195 | 12/2001 |
| JP | 2002-79751 A | 3/2002 |
| WO | WO 99/28397 | 6/1999 |

OTHER PUBLICATIONS

Jan. 16, 2006 Communication: European Search Report dated Jan. 9, 2006.
Dec. 29, 2005 Communication: European Search Report dated Dec. 21, 2005.

* cited by examiner

Primary Examiner—Manish S. Shah
(74) Attorney, Agent, or Firm—Westerman, Hattori, Daniels & Adrian, LLP.

(57) ABSTRACT

An ink for sublimation transfer ink jet recording includes water, at least one sugar alcohol containing not less than four OH groups, a sublimation dye, a dispersant, and a compound expressed by the following chemical formula (I):

$$R-O-(CH_2CH_2O)_n-H \qquad (I)$$

where R is an alkyl group having a carbon number of 25 to 150 and n is from 2 to 100. The ink is printed on a sheet medium by ink jet printing, and then the sheet medium is heated to sublimate and transfer the sublimation dye onto an object to be dyed. The ink for ink jet recording and the sublimation transfer dyeing method using the ink not only can maintain performances such as storage stability and high-quality recording images, but also can reduce environmental pollution, effectively prevent nozzle clogging, exhibit good dispersion stability, and achieve a high redispersion property that ensures stable ejection both during long continuous operation and after stopping the operation for a long time.

12 Claims, No Drawings

INKJET RECORDING INK FOR SUBLIMATION TRANSFER AND METHOD OF DYEING

TECHNICAL FIELD

The present invention relates to ink for sublimation transfer ink jet recording in an ink jet recording system and a sublimation transfer dyeing method using the ink. Specifically, the present invention relates to ink for sublimation transfer ink jet recording that includes a sublimation dye used in a piezo ink jet system and can reduce environmental pollution, effectively prevent nozzle clogging of a recording head, and have excellent storage stability, and a sublimation transfer dyeing method.

BACKGROUND ART

Water-based ink for ink jet recording is used generally in the form of a water-soluble dye solution or a liquid obtained by dispersing a water-insoluble color material into water or an aqueous solution including a water-soluble organic solvent. On the other hand, ink for ink jet recording that includes a sublimation dye has been used for sublimation transfer dyeing. For example, there is a method in which the ink including a sublimation dye is printed by ink jet printing on a sheet medium such as paper, and this medium is then put on a hydrophobic fiber product or resin film product for sublimation transfer. There is also another method, as disclosed, e.g., by JP 2002-79751 A, in which the ink including a sublimation dye is printed by ink jet printing on a film product that has a releasable ink receptor layer and can be used for sublimation and diffusion dyeing, the film product is then heated so that the lower layer is dyed by sublimation and diffusion, and the ink receptor layer is removed.

The sublimation dye ink is used generally in the form of a liquid obtained by dispersing the sublimation dye into an aqueous solution including water, a water-soluble organic solvent, and a dispersant. However, the water-soluble organic solvent is evaporated with water by heat treatment, e.g., when the ink is printed on the paper medium by ink jet printing, the medium is then put on a transfer object, and the object is dyed by sublimation transfer while heating, or when the ink is printed on the releasable ink receptor layer of the film product that can be used for sublimation and diffusion dyeing, the film product is then heated to sublimate and diffuse the sublimation dye so that the lower layer of the film product is dyed. This is the point different from ink jet printing that is used only for general printing purposes. The sublimation transfer dyeing method requires heating for a predetermined time at temperatures higher than the sublimation point of the sublimation dye. Therefore, even a high-boiling organic solvent may be evaporated. Particularly for a high-boiling organic solvent such as glycerin, the temperature is reduced to a condensation point shortly after the evaporated solvent is released into the atmosphere, thus causing smoky steam. This is considered to be undesirable because the appearance becomes extremely worse. One possibility for avoiding such a problem is to use a low-boiling solvent that does not cause any smoky steam. However, the low-boiling solvent is the same as the high-boiling organic solvent in release of the evaporated solvent into the atmosphere. In either case, therefore, environmental pollution (e.g., working environment) is a problem.

Characteristics required for ink for ink jet recording are as follows: (1) ejection stability while preventing nozzle clogging; (2) storage stability; (3) high-quality recording images resulting from uniformity in the direction of ink ejected, the ejection amount, and the dot shape; (4) quick drying and fixation; and (5) high print density.

In an ink jet recording system, ink should be ejected from thin nozzles as ink droplets. Therefore, (1) is particularly important. When the ink jet recording system is of the drop-on-demand type, the ejection of ink from the nozzles is stopped temporarily even during continuous operation. This may lead to an ejection failure in long continuous operation.

Unlike a water-soluble dye, the ink for sublimation transfer ink jet recording that includes a sublimation dye tends to cause clogging, e.g., because precipitates (aggregates) are generated by the degradation of dispersion stability and moisture is evaporated from the nozzles. In particular, when the apparatus is not operated for a long time, clogging is likely to occur due to evaporation of moisture.

Therefore, a humectant is added to suppress the evaporation of moisture. Examples of the humectant include a high-boiling organic solvent of glycols such as glycerin or polyethylene glycol, and saccharides.

As described above, however, the sublimation transfer method requires heating for a predetermined time at temperatures higher than the sublimation point of the sublimation dye. Therefore, even if a high-boiling organic solvent is used as a humectant, the solvent is evaporated at a heating temperature during sublimation transfer, resulting in environmental pollution. Thus, it is necessary to use a humectant that is not an organic solvent, is not evaporated by heating in sublimation transfer, and has no adverse effect on the characteristics (1) to (5) required for the ink.

As an example of a humectant other than a water-soluble organic solvent, JP 57(1982)-57762 A discloses a water-based inkjet ink including a water-soluble dye and sorbitol. JP 60(1985)-72968 A and JP 62(1987)-101672 A disclose a water-based pigment ink including pigment and sorbitol. JP 2(1990)-214785 A discloses a water-based ink for ball point pen that includes maltitol and uses a water-soluble dye or pigment as a colorant. JP 2001-115070 A discloses that xylitol and a water-soluble organic solvent are used for carbon black dispersions.

In the above conventional techniques, sugar alcohol has been used as a humectant for a pigment ink or water-soluble dye ink. However, none of the conventional techniques disclose whether sugar alcohol can be used as a humectant for an ink in which a sublimation dye is dispersed with a dispersant. Moreover, no study has been conducted on a sublimation dye ink that includes the smallest possible amount of water-soluble organic solvent in consideration of environment, and no technique has sought to find a solution to a problem that may arise with that case. Further, sugar alcohol should be used as a humectant while taking into account the fact that it has no adverse effect (e.g., oxidation-reduction) on the sublimation dye.

JP 2000-265098 A discloses an inkjet ink that includes water, a colorant, and a compound expressed by the following chemical formula (II):

$$R-A-(CH_2CH_2O)_x-H \qquad (II)$$

where R is linear saturated hydrocarbon having a carbon number of 14 to 23, A is O or OCO, and x is an integer of 1 to 3. This ink may include a humectant as needed.

However, JP 2000-265098 A discloses "various dyes, pigment, or colored polymer/wax can be used as a colorant, and a water-soluble dye is particularly preferred. Any type of water-soluble dye, e.g., . . . can be used, and an acid dye and direct dye are particularly preferred." In this document, only acid dye is used actually in the example. Therefore, as is evident from the description, JP 2000-265098 A does not disclose the use of the compound expressed by the chemical formula (II) in a sublimation dye ink. Even if R is polyoxyethylene higher alkyl ethers having a carbon number of not more than 23, it is not possible to provide an ink composition with a high redispersion property when a sublimation dye is used as a colorant.

To solve the above problems of a conventional ink for ink jet recording that includes a sublimation dye, an object of the present invention is to provide an ink for ink jet recording that not only can reduce environmental pollution and maintain required performances such as storage stability and high-quality recording images, but also can effectively prevent nozzle clogging, exhibit good dispersion stability, and achieve a high redispersion property that ensures stable ejection both during long continuous operation and after stopping the operation of an apparatus for a long time. Another object of the present invention is to provide a sublimation transfer dyeing method using this ink.

SUMMARY OF INVENTION

An ink for sublimation transfer ink jet recording of the present invention includes water, at least one sugar alcohol containing not less than four OH groups, a sublimation dye, a dispersant, and a compound expressed by the following chemical formula (I):

$$R\text{—}O\text{—}(CH_2CH_2O)_n\text{—}H \qquad (I)$$

where R is an alkyl group having a carbon number of 25 to 150 and n is from 2 to 100.

A sublimation transfer dyeing method of the present invention includes printing the ink for sublimation transfer ink jet recording on a sheet medium by ink jet printing, and heating the sheet medium to sublimate and transfer the sublimation dye onto an object to be dyed.

DETAILED DESCRIPTION OF INVENTION

An ink for ink jet recording of the present invention that uses a sublimation dye as a color component is excellent not only in maintaining required performances such as storage stability and high-quality recording images, but also in achieving a high redispersion property with reduced environmental pollution, effectively preventing nozzle clogging, and ensuring stable ejection by normal cleaning both during long continuous operation and after stopping the operation of an apparatus for a long time.

A sublimation transfer dyeing method of the present invention allows the ink for sublimation transfer ink jet recording to be printed by ink jet printing, followed by sublimation transfer. Thus, this method can reduce environmental pollution while maintaining required performances such as storage stability and high-quality recording images of the ink used for dyeing. Therefore, the ink used can improve the redispersion property and effectively prevent nozzle clogging, which makes it possible to perform dyeing all the time and to ensure stable ejection by normal cleaning both during long continuous operation and after stopping the operation of an apparatus for a long time.

In the ink for sublimation transfer ink jet recording and the sublimation transfer dyeing method using the ink of the present invention, it is preferable that the sugar alcohol containing not less than four OH groups is at least one selected from the group consisting of D-sorbitol, xylitol, and maltitol.

In the ink for sublimation transfer ink jet recording and the sublimation transfer dyeing method using the ink of the present invention, it is preferable that R is an alkyl group having a carbon number of 30 to 50 and n is from 10 to 50 in the chemical formula (I).

In the ink for sublimation transfer ink jet recording and the sublimation transfer dyeing method using the ink of the present invention, it is preferable that hydrophile-lipophile balance (HLB) of the compound expressed by the chemical formula (I) is not less than 10.

In the ink for sublimation transfer ink jet recording and the sublimation transfer dyeing method using the ink of the present invention, it is preferable that the sublimation dye is at least one selected from the group consisting of a disperse dye and a solvent dye.

In the ink for sublimation transfer ink jet recording and the sublimation transfer dyeing method using the ink of the present invention, it is preferable that the dispersant is at least one selected from the group consisting of an anionic surfactant, a nonionic surfactant, and a high-molecular surfactant.

In the ink for sublimation transfer ink jet recording and the sublimation transfer dyeing method using the ink of the present invention, it is preferable that the amount of the sugar alcohol containing not less than four OH groups is 0.5 to 50 wt % with respect to the total weight of ink.

In the ink for sublimation transfer ink jet recording and the sublimation transfer dyeing method using the ink of the present invention, it is preferable that the amount of the sugar alcohol containing not less than four OH groups is 0.5 to 50 wt %, the amount of the sublimation dye is 0.2 to 12 wt %, the amount of the dispersant is 0.1 to 20 wt %, and the amount of the compound expressed by the chemical formula (I) is 0.1 to 8 wt % with respect to the total weight of ink.

In the ink for sublimation transfer ink jet recording and the sublimation transfer dyeing method using the ink of the present invention, it is preferable that the ink does not substantially include a water-soluble organic solvent (i.e., the substantial amount of the water-soluble organic solvent is 0 wt %).

According to the present invention, the sublimation dye is dispersed using the dispersant, and the sugar alcohol containing not less than four OH groups is included as a humectant in the ink having the chemical formula (I), thereby making the amount of water-soluble organic solvent as small as possible to achieve an environmentally oriented sublimation dye ink.

Unlike polyoxyethylene higher alkyl ethers used in a conventional ink for ink jet recording, the compound expressed by the chemical formula (I) of the present invention includes an alkyl group having a carbon number of not less than 25. The upper limit of the carbon number of the alkyl group generally is not more than 150. As a conventional example, natural or synthetic alcohol compounds have been commercially available. However, these compounds normally include an alkyl group having a carbon number of about 12 to 18. The above-described JP 2000-265098 A discloses a polyoxyethylene alkyl ether compound that includes an alkyl group having a carbon number of 14 to 23.

However, when a sublimation dye is used as a colorant, it is not possible to achieve an ink composition with a high redispersion property even by using the polyoxyethylene higher alkyl ethers having a carbon number of less than 25. Therefore, the present invention requires that R should be an alkyl group having a carbon number of 25 to 150.

The sugar alcohol used in the present invention is preferably sugar alcohol derived from monosaccharide or sugar alcohol derived from disaccharide. Examples of the sugar alcohol derived from monosaccharide include threitol, erythritol, arabitol, ribitol, xylitol, lyxitol, sorbitol, mannitol, iditol, gulitol, talitol, galactitol, allitol, and altritol. Examples of the sugar alcohol derived from disaccharide include maltitol, isomaltitol, lactitol, and turanitol. The present invention requires sugar alcohol containing not less than four OH groups. The sugar alcohol containing less than four OH groups, e.g., glycerin is not preferable because it is evaporated by heating in sublimation transfer. Among the above examples, D-sorbitol, xylitol, and maltitol are preferred, and D-sorbitol is particularly preferred in view of solubility and cost efficiency. They can be used individually or as a mixture of two or more types of sugar alcohol. To adjust the ink viscosity and to prevent clogging by utilizing a moisture retention effect, the amount of sugar alcohol used in the present invention is preferably 0.5 to 50 wt %, more preferably 2 to 40 wt %, and even more preferably 5 to 25 wt % with respect to the total weight of ink.

It is preferable that that a water-soluble organic solvent is not used (i.e., the substantial amount of water-soluble organic solvent is 0 wt %) in the present invention. However, the water-soluble organic solvent may be used together with the sugar alcohol, as long as it does not impede the purpose of the present invention. Examples of the water-soluble organic solvent include polyhydric alcohols such as ethylene glycol, diethylene glycol, propylene glycol, butylene glycol, triethylene glycol, tetraethylene glycol, polyethylene glycol, polypropylene glycol, thiodiglycol, and glycerin, glycol ethers such as ethylene glycol monomethyl ether, diethylene glycol monomethyl ether, diethylene glycol monoethyl ether, diethylene glycol monobutyl ether, and propylene glycol monomethyl ether, alcohols such as isopropyl alcohol, methanol, and ethanol, and basic solvents such as N-methyl-2-pyrrolidone and triethanolamine.

Among these water-soluble organic solvents, glycerin, diethylene glycol, polyethylene glycol 200, polyethylene glycol 300, polyethylene glycol 400, and propylene glycol are preferred in view of moisture retention.

They can be used individually or as a mixture of two or more solvents.

In a compound expressed by the following chemical formula (I) of the present invention, R is an alkyl group having a carbon number of 25 to 150. The ink composition for ink jet recording can achieve a high redispersion property by using a compound that includes R having a carbon number of not less than 25. The use of a compound expressed by the following chemical formula (I) also is preferred for continuous ejection stability, ejection performance after long-time non-operation, and long-time storage stability. In view of solubility in a water-based ink composition, a compound that includes R having a carbon number of not more than 150 is appropriate. The carbon number of R (alkyl group) is preferably 30 to 50, and more preferably 30 to 35. Further, n ranges from 2 to 100, preferably 10 to 50, and more preferably 20 to 50. The alkyl group can be either linear or branched-chain, but a linear alkyl group is preferred.

In view of solubility in water, HLB is not less than 4, preferably not less than 10, and more preferably ranges from 14 to 18.

$$R\text{—}O\text{—}(CH_2CH_2O)_n\text{—}H \qquad (I)$$

The compound expressed by the chemical formula (I) is used preferably in an amount of 0.1 to 8 wt %, more preferably 0.1 to 6 wt %, and even more preferably 0.2 to 4 wt % with respect to the total weight of ink. By adjusting the amount of the compound within the range of 0.1 to 8 wt %, the ink viscosity is not excessively high, so that the ink can provide an intended effect.

Examples of the compound expressed by the chemical formula (I) include the following products manufactured by Baker Petrolite Corporation in the U.S.: "UNITHOX 420" (R is a linear alkyl group having a carbon number of 31 to 32, n is about 3, and HLB is 4); "UNITHOX 450" (R is a linear alkyl group having a carbon number of 31 to 32, n is about 10, and HLB is 10); "UNITHOX 480" (R is a linear alkyl group having a carbon number of 31 to 32, n is about 40, and HLB is 16); "UNITHOX 520" (R is a linear alkyl group having a carbon number of 38, n is about 3, and HLB is 4); "UNITHOX 550" (R is a linear alkyl group having a carbon number of 38, n is about 12, and HLB is 10); "UNITHOX 720" (R is a linear alkyl group having a carbon number of 48 to 49, n is about 4, and HLB is 4); and "UNITHOX 750" (R is a linear alkyl group having a carbon number of 48 to 49, n is about 16, and HLB is 10).

The sublimation dye is preferably a disperse dye or solvent dye having a sublimation property. These dyes can be used individually or as a mixture, and the disperse dye is particularly preferred in view of dispersibility and dyeing property.

Dyes that are sublimated or evaporated at 70 to 260° C. under atmospheric pressure, such as azo, anthraquinone, quinophthalone, styryl, diphenylmethane or triphenylmethane, oxazine, triazine, xanthene, methine, azomethine, acridine, and diazine are suitable for the sublimation dye. Among these dyes, examples of a yellow disperse dye include C. I. Disperse Yellow 51, 54, 60, 64, 65, 82, 98, 119, 160, and 211. Examples of a red disperse dye include C. I. Disperse Red 4, 22, 55, 59, 60, 146, 152, 191, 302, and Vat Red 41. Examples of a blue disperse dye include C. I. Disperse Blue 14, 28, 56, 60, 72, 73, 77, 334, 359, and 366. Other color components are, e.g., Violet 27 and 28. Examples of the solvent dye include C. I. Solvent Orange 25, 60, Red 155, Blue 35, 36, 97, and 104.

To maintain the dispersion stability of the ink and to provide required print concentration, the amount of the sublimation dye is preferably 0.2 to 12 wt %, and more preferably 0.5 to 8 wt % with respect to the total weight of ink.

The dispersant of the present invention not only disperses the sublimation dye into a water-based medium, but also has the function of maintaining the dispersion stability of the sublimation dye in the form of fine particles. There is no particular limitation to the dispersant, as long as it can be used with the sugar alcohol and the compound expressed by the chemical formula (I). For example, an anionic surfactant, a nonionic surfactant, or a high-molecular surfactant can be used individually or as a mixture. The anionic surfactant and the nonionic surfactant are suitable for the dispersion of the disperse dye or the solvent dye, and the anionic surfactant is particularly preferred.

Examples of the anionic surfactant include naphthalene sulfonate formaldehyde condensate, lignin sulfonates, special arylsulfonate formaldehyde condensate (e.g., a formaldehyde condensate of sodium alkyl naphthalene sulfonate such as sodium butylnaphthalene sulfonate and sodium naphthalene sulfonate, a formaldehyde condensate of sodium cresol sulfonate and 2-Naphthol-6-sulfonic acid sodium salt, sodium cresol sulfonate formaldehyde condensate, or sodium creosote oil sulfonate formaldehyde condensate), and polyoxyethylene alkyl ether sulfate.

Examples of the nonionic surfactant include polyoxyethylene sorbitan fatty acid ester, polyoxyethylene alkyl ether, polyoxyethylene alkyl phenyl ether, polyoxyethylene acetylene glycol, polyoxyethylene derivatives, and oxyethylene oxypropylene block copolymers.

Examples of the high-molecular surfactant include polyacrylic partial alkyl ester, polyalkylene polyamine, polyacrylate, styrene-acrylic acid copolymers, and vinylnaphthalene-maleic acid copolymers.

To maintain good dispersion stability of the sublimation dye, the amount of the dispersant is preferably 0.1 to 20 wt %, and more preferably 0.1 to 12 wt % with respect to the total weight of ink.

In addition to the above materials, the ink of the present invention may include various additives, if necessary, so as not to impede the attainment of the object of the present invention. Examples of the additives include a surface control agent, a hydrotropic agent, a pH regulator, a viscosity modifier, a preservative, an antifungal agent, a light stabilizer, a chelating agent, and an antifoaming agent.

Examples of the surface control agent include a fluorochemical surfactant, a polyether modified dimethylpolysiloxane, and acrylic polymers, and particularly the polyether modified dimethylpolysiloxane and the acrylic polymers are suitable for the present invention. These surface control agents are useful to control the surface tension of the ink so that a material for forming the ink flow passage is wetted easily when it comes into contact with the ink. The amount of the surface control agent is preferably 0.05 to 1 wt %, and more preferably 0.1 to 0.5 wt % with respect to the total weight of ink. When the amount is less than 0.05 wt %, the above effect is likely to be reduced. When the amount is more than 1 wt %, the above effect is not likely to be enhanced anymore.

A method for producing an ink for ink jet recording of the present invention is not particularly limited. For example, a preferred method includes the following:

(1) A sublimation dye, the sugar alcohol, a compound expressed by the chemical formula (I), a dispersant, and water are mixed and stirred to prepare predispersions. In this case, a water-soluble organic solvent or any of the above additives may be added as needed.

(2) The predispersions are placed in a wet mill (e.g., a sand mill) so that the sublimation dye is pulverized into fine particles and dispersed, thereby producing dye dispersions.

(3) To the dye dispersions are added water or, if necessary, a water-soluble organic solvent and any of the above additives, and then the concentration is adjusted. The resultant liquid is filtered, e.g., through a filter paper before use.

In this method, the sugar alcohol may be added either when the sublimation dye is pulverized or when the concentration is adjusted. Alternatively, the sugar alcohol may be divided and added in both cases. In view of workability, it is preferable to use an aqueous solution that is prepared beforehand or a commercially available aqueous solution.

The compound expressed by the chemical formula (I) may be added either when the sublimation dye is pulverized or when the concentration is adjusted. Alternatively, the compound may be divided and added in both cases. In view of workability, it is preferable to use an aqueous solution of about 10 to 15 wt % that is prepared beforehand.

The average particle size of the sublimation dye obtained by the above method is preferably not more than 0.5 μm, and more preferably ranges from 0.05 to 0.2 μm.

The foregoing explanation only gives some examples of a sublimation dye, sugar alcohol containing not less than four OH groups, a dispersant, and other components, and the present invention is not limited thereto.

A sublimation transfer dyeing method using the ink for sublimation transfer ink jet recording of the present invention includes printing the ink on a sheet medium by ink jet printing, and heating the sheet medium to sublimate and transfer the sublimation dye onto an object to be dyed.

The shape or material of the object to be dyed is not particularly limited, as long as it can be dyed by sublimation transfer. In general, a cloth of hydrophobic fibers or sheet materials such as a resin film and paper are used. However, not only the sheet materials but also three-dimensional, e.g., spherical or cubic materials can be used.

There is a method for sublimation transfer dyeing with the ink for sublimation transfer ink jet recording of the present invention, in which the ink is printed by ink jet printing on a sheet medium such as paper, and this medium is then put on an object to be dyed such as a hydrophobic fiber product or resin film product for sublimation transfer. There is also another method of the present invention, in which the ink is printed by ink jet printing on the film product that has a releasable ink receptor layer and can be used for sublimation and diffusion dyeing, the film product is then heated so that the lower layer is dyed by sublimation and diffusion, and the ink receptor layer is removed.

Examples of the sheet medium used in the former method include a non-coated recording sheet medium such as plain paper and a recording sheet medium made of a sheet-like base with a coating layer that includes at least hydrophilic polymer and/or inorganic porous material.

The sheet medium used in the latter method corresponds to the releasable ink receptor layer, and the object to be dyed corresponds to the lower layer of the film product.

In this case, the ink receptor layer is, e.g., a layer that mainly includes a water-soluble resin capable of quickly absorbing ink, and the water-soluble resin component can be water-soluble or hydrophilic natural or synthetic polymer. For example, the water-soluble resin component may include at least one selected from the following: a polyvinyl alcohol resin; a polyurethane resin; a polyvinyl acetal resin; polyvinyl methyl ether; vinyl methyl ether-maleic anhydride copolymers; polyvinyl pyrrolidone; vinyl pyrrolidone-styrene copolymers; vinyl pyrrolidone-vinyl acetate copolymers; a water-soluble acrylic resin synthesized from at least one monomer selected from acrylic acid, methacrylic acid, acrylic ester, and methacrylic acid or a mixture of the at least one monomer and other monomers; a vinyl resin such as polyacrylamide; polyethylene oxide; a synthetic resin such as polyglutamate; a semisynthetic resin of cellulose derivative such as carboxymethyl cellulose or methylcellulose; and a natural resin such as chitin, chitosan, starch, or gelatin. Moreover, polyanion polyelectrolyte such as alkali metal salt of polyacrylic acid or polystyrene sulfonic acid, polycation polyelectrolyte such as polyethyleneimine, polyvinylamine, polyallylamine, polyvinyl alkyl ammonium halide, or polyvinyl benzil alkyl ammonium halide, or amphoteric polyelectrolyte also can be used. Further, porous pigment such as silica, clay, talc, diatomaceous earth, zeolite, calcium carbonate, alumina, zinc oxide, or titanium oxide may be added in view of the absorption of ink.

Examples of the lower layer of the film product, which is used as the object to be dyed, include a polyester film, a polyurethane film, a polycarbonate film, a polyphenylene sulfide film, a polyimide film, and a polyamide-imide film, and a film obtained by coating the surface of any one of these films with a resin that has no affinity for the sublimation dye (e.g., fluorocarbon resin), and further a film made of a material that is suitable for sublimation dyeing and neither melts nor shrinks by heat during sublimation transfer.

The heating temperature for sublimation transfer depends on the type of a sublimation dye to be used, and generally is about 150 to 200° C. The heating time is about 2 to 10 minutes.

Hereinafter, the present invention will be described in more detail by way of examples. However, the present invention is not limited to the following examples. In each of the examples, "parts" indicates "parts by weight" and "%" indicates "wt %" unless otherwise noted.

WORKING EXAMPLE 1

A mixture including 20 parts of red disperse dye dry cake (C. I. Disperse Red 60), 12 parts of special sodium arylsulfonate formaldehyde condensate ("DEMOL SN—B" manufactured by Kao Corporation) which is an anionic surfactant used as a dispersant, 5 parts of "UNITHOX 480" (manufactured by Baker Petrolite Corporation and corresponding to a compound expressed by the chemical formula (I) where R is a linear alkyl group having a carbon number of 31 to 32, n is about 40, and HLB is 16), and 123 parts of water was prepared. This mixture was pulverized for 35 hours in a sand mill using 330 parts of zircon beads with a diameter of 0.4 mm, thus producing dispersions.

To the dispersions were added 5 parts of "UNITHOX 480", 85 parts of "SORBITOL S" (manufactured by Nikken Chemicals Co., Ltd., D-sorbitol aqueous solution 70%), 2.0 parts of polyether modified dimethylpolysiloxane ("BYK-348" manufactured by BYK-Chemie Japan) that serves as a surface control agent, and water, so that ink with an adjusted dye concentration of 5% was obtained. The average particle size of the dye was 0.10 µm.

WORKING EXAMPLE 2

A mixture was prepared and pulverized in the same manner as in Working Example 1 except that 20 parts of yellow disperse dye dry cake (C. I. Disperse Yellow 54) were used instead of the red disperse dye dry cake, thus producing dispersions. To the dispersions were added 25 parts of "UNITHOX 480" that corresponds to a compound expressed by the chemical formula (I), 215 parts of "SORBITOL S", 2.5 parts of "BYK-348" that serves as a surface control agent, and water, so that ink with an adjusted dye concentration of 2% was obtained. The average particle size of the dye was 0.12 µm.

WORKING EXAMPLE 3

A mixture including 20 parts of blue disperse dye dry cake (C. I. Disperse Blue 72), 12 parts of sodium β-naphthalene sulfonate formaldehyde condensate ("DEMOL N" manufactured by Kao Corporation) which is an anionic surfactant used as a dispersant, 5 parts of "UNITHOX 480" that corresponds to a compound expressed by the chemical formula (I), and 123 parts of water was prepared. This mixture was pulverized in the same manner as in Working Example 1 by using 330 parts of zircon beads with a diameter of 0.4 mm, thus producing dispersions. To the dispersions were added 15 parts of "UNITHOX 480", 130 parts of "SORBITOL S", 2.4 parts of acrylic polymer ("BYK-381" manufactured by BYK-Chemie Japan) that serves as a surface control agent, and water, so that ink with an adjusted dye concentration of 3.3% was obtained. The average particle size of the dye was 0.08 µm.

WORKING EXAMPLE 4

A mixture was prepared and pulverized in the same manner as in Working Example 1 to produce dispersions. To 40 parts of the dispersions were added 10 parts of "UNITHOX 480" that corresponds to a compound expressed by the chemical formula (I), 85 parts of "SORBITOL S", 0.4 parts of "BYK-348" that serves as a surface control agent, and water, so that ink with an adjusted dye concentration of 1.25% was obtained.

WORKING EXAMPLE 5

Ink was produced in the same manner as in Working Example 1 except that 60 parts of xylitol was used instead of the "SORBITOL S" in Working Example 1.

WORKING EXAMPLE 6

Ink was produced in the same manner as in Working Example 1 except that 60 parts of maltitol was used instead of the "SORBITOL S" in Working Example 1.

WORKING EXAMPLE 7

A mixture including 20 parts of red disperse dye dry cake (C. I. Disperse Red 60), 12 parts of special sodium arylsulfonate formaldehyde condensate ("DEMOL SN—B" manufactured by Kao Corporation) which is an anionic surfactant used as a dispersant, 3 parts of "UNITHOX 480", and 125 parts of water was prepared. This mixture was pulverized for 35 hours in a sand mill using 330 parts of zircon beads with a diameter of 0.4 mm, thus producing dispersions.

To the dispersions were added 85 parts of "SORBITOL S", 2.0 parts of "BYK-348" that serves as a surface control agent, and water, so that ink with an adjusted dye concentration of 5% was obtained. The average particle size of the dye was 0.10 µm.

WORKING EXAMPLE 8

A mixture was prepared and pulverized in the same manner as in Working Example 7 except that 20 parts of yellow disperse dye dry cake (C. I. Disperse Yellow 54) instead of the red disperse dye dry cake, 4 parts of "UNITHOX 480", and 124 parts of water were used, thus producing dispersions. To the dispersion were added 215 parts of "SORBITOL S", 2.5 parts of "BYK-348" that serves as a surface control agent, and water, so that ink with an adjusted dye concentration of 2% was obtained. The average particle size of the dye was 0.12 µm.

WORKING EXAMPLE 9

A mixture was prepared and pulverized in the same manner as in Working Example 7 to produce dispersions. To 40 parts of the dispersions were added 3.3 parts of "UNITHOX 480" that corresponds to a compound expressed by the chemical formula (I), 85 parts of "SORBITOL S", 0.4 parts of "BYK-348" that serves as a surface control agent, and water, so that ink with an adjusted dye concentration of 1.25% was obtained.

COMPARATIVE EXAMPLE 1

Ink was produced in the same manner as in Working Example 1 except that 60 parts of glycerin was used instead of the "SORBITOL S" in Working Example 1.

COMPARATIVE EXAMPLE 2

Ink was produced in the same manner as in Working Example 1 except that 60 parts of diethylene glycol was used instead of the "SORBITOL S" in Working Example 1.

COMPARATIVE EXAMPLE 3

Ink was produced in the same manner as in Working Example 1 except that special sodium arylsulfonate formaldehyde condensate ("DEMOL SN—B" manufactured by Kao Corporation) was used in equal amount instead of the "UNITHOX 480" in Working Example 1.

COMPARATIVE EXAMPLE 4

Ink was produced in the same manner as in Working Example 1 except that "UNITHOX 480" was used in equal amount instead of the "DEMOL SN—B" in Working Example 1. The particle size of the dye was not less than 1 μm. When the ink thus produced was allowed to stand, the dye gradually aggregated to form precipitates. Therefore, it was not possible to use the ink for ink jet recording because the storage stability was poor without a dispersant.

Table 1 shows the ratio of components other than water for each of the ink compositions in Working Examples 1 to 9 and Comparative Examples 1 to 3.

Moreover, the following tests were conducted on each of the inks produced in Working Examples 1 to 9 and Comparative Examples 1 to 3. Table 2 shows the results.

(1) Redispersion Property Test

A thin coating of ink composition (0.5 g) was applied to the surface of a watch glass (φ90 mm), and the watch glass was placed in a thermo-hygrostat that was kept at 30° C., 20% relative humidity and left for 3 hours. Then, the watch glass was taken out of the drier, and a peripheral portion of the dried ink was washed gently with a small amount of water from the outside of the peripheral portion. The state of the ink was observed and evaluated as follows.

Evaluations: ○ indicates that the ink is redispersed immediately without any aggregation; Δ indicates that aggregates in the form of a small thin film are partially generated, but not attached to the glass surface; and × indicates that a considerable amount of aggregates is generated and remain attached to the glass surface.

(2) Continuous Ejection Stability Test

Using a commercially available large-format ink jet plotter ("JV2-130" (piezo-type) manufactured by Mimaki Engineering, Co., Ltd), continuous printing was performed under the conditions of 720×720 dpi resolution, single color, solid printing, and 1200 mm print width until some print errors such as missing dots were caused.

Evaluations: ○ indicates that no clogging occurs after 5 hours or more; Δ indicates that clogging occurs between 30 minutes and 1 hour; and × indicates that clogging occurs within 30 minutes.

(3) Ejection Performance After Long-time Non-operation

The ink jet plotter continued to operate for 30 minutes under the above conditions, and then stopped for 48 hours. After normal cleaning, a print test was conducted again to examine whether or not printing was performed normally under the same conditions.

Evaluations: ○ indicates that normal printing can be performed by operating one head cleaning in the manner specified for the ink jet plotter; Δ indicates that several cleaning cycles are necessary; and × indicates that further cleaning cycles are not helpful in performing normal printing.

(4) Sublimation Transfer Dyeing Test

A film product that has a releasable ink receptor layer and can be used for sublimation transfer dyeing was prepared in the following manner. First, a 50 μm thick polyester film substrate was coated with a 30 μm thick dye fixing layer made of polyurethane resin and was dried. Then, the dye fixing layer was coated with a 20 μm thick fluoroolefin copolymer resin layer and was cross-liked. After an adhesive layer and release paper were bonded to the back of the film, a cross-linkable urethane coating material for ink jet ("PATELACOL IJ-50", a registered trademark of DAINIPPON INK AND CHEMICALS, INC.) was applied to the surface of the film in a thickness of 20 μm so as to form an ink receptor layer. Using the ink for sublimation transfer ink jet recording produced in Working Examples 1 to 9 and Comparative Examples 1 to 3, an image was printed on the ink receptor layer of the film product with the large-format ink jet plotter ("JV2-130" (piezo-type) manufactured by Mimaki Engineering, Co., Ltd.), followed by heat treatment at about 170° C. for about 7 minutes in a hot-air dryer ("FINE OVEN DF62" manufactured by Yamato Scientific Co., Ltd.). During the heat treatment, the conditions of heated steam issued from the vent of the dryer were observed. Upon removal of the ink receptor layer, the image was formed into the film product by sublimation and diffusion dyeing.

Evaluations: ○ indicates that no smoky steam is generated; Δ indicates that a small amount of smoky steam is generated; × indicates that a considerable amount of smoky steam is generated.

TABLE 1

Ink compositions in Working Examples and Comparative Examples (wt %)

|  | Working Examples |  |  |  |  |  |  |  |  | Comparative Examples |  |  |
|---|---|---|---|---|---|---|---|---|---|---|---|---|
|  | 1 | 2 | 3 | 4 | 5 | 6 | 7 | 8 | 9 | 1 | 2 | 3 |
| Y-54 | — | 2.0 | — | — | — | — | — | 2.0 | — | — | — | — |
| R-60 | 5.0 | — | — | 1.25 | 5.0 | 5.0 | 5.0 | — | 1.25 | 5.0 | 5.0 | 5.0 |
| B-72 | — | — | 3.3 | — | — | — | — | — | — | — | — | — |
| DEMOL SN-B | 3.0 | 1.2 | — | 0.75 | 3.0 | 3.0 | 3.0 | 1.2 | 0.75 | 3.0 | 3.0 | 5.5 |
| DEMOL N | — | — | 2.0 | — | — | — | — | — | — | — | — | — |
| UNITHOX 480 | 2.5 | 3.0 | 3.5 | 2.8 | 2.5 | 2.5 | 0.75 | 0.4 | 1.0 | 2.5 | 2.5 | — |
| SORBITOL S | 15 | 15 | 15 | 15 | — | — | 15 | 15 | 15 | — | — | 15 |
| Xylitol | — | — | — | — | 15 | — | — | — | — | — | — | — |
| Maltitol | — | — | — | — | — | 15 | — | — | — | — | — | — |

TABLE 1-continued

Ink compositions in Working Examples and Comparative Examples (wt %)

| | Working Examples | | | | | | | | | Comparative Examples | | |
|---|---|---|---|---|---|---|---|---|---|---|---|---|
| | 1 | 2 | 3 | 4 | 5 | 6 | 7 | 8 | 9 | 1 | 2 | 3 |
| Glycerin | — | — | — | — | — | — | — | — | — | 15 | — | — |
| Diethylene G | — | — | — | — | — | — | — | — | — | — | 15 | — |
| BYK-348 | 0.50 | 0.25 | — | 0.10 | 0.50 | 0.50 | 0.50 | 0.25 | 0.10 | 0.50 | 0.50 | 0.50 |
| BYK-381 | — | — | 0.40 | — | — | — | — | — | — | — | — | — |

"Y-54" represents yellow disperse dye dry cake (C. I. Disperse Yellow 54), "R-60" represents red disperse dye dry cake (C. I. Disperse Red 60), "B-72" represents blue disperse dye dry cake (C. I. Disperse Blue 72), and "Diethylene G" represents diethylene glycol. The ratio of "SORBITOL S" is expressed in terms of solid content.

TABLE 2

| | Working Examples | | | | | | | | | Comparative Examples | | |
|---|---|---|---|---|---|---|---|---|---|---|---|---|
| | 1 | 2 | 3 | 4 | 5 | 6 | 7 | 8 | 9 | 1 | 2 | 3 |
| Redispersion property | ○ | ○ | ○ | ○ | ○ | ○ | ○ | ○ | ○ | ○ | ○ | X |
| Continuous ejection stability | ○ | ○ | ○ | ○ | ○ | ○ | ○ | ○ | ○ | ○ | ○ | △ |
| Ejection performance after long-time non-operation | ○ | ○ | ○ | ○ | ○ | ○ | ○ | ○ | ○ | ○ | ○ | X |
| Conditions during sublimation transfer | ○ | ○ | ○ | ○ | ○ | ○ | ○ | ○ | ○ | X | X | ○ |

As can be seen from the results, Working Examples 1 to 9 do not cause any smoky steam during heat treatment and also are superior in redispersion property, continuous ejection stability, and ejection performance after long-time non-operation. Comparative Examples 1 and 2, in which D-sorbitol is replaced by glycerin or diethylene glycol, cause considerable smoky steam. Comparative Example 3, in which an anionic dispersant is used instead of the compound expressed by the chemical formula (I), does not cause smoky steam, but is inferior in redispersion property, continuous ejection stability, and ejection performance after long-time non-operation.

INDUSTRIAL APPLICABILITY

An ink for ink jet recording of the present invention that uses a sublimation dye as a color component has the effects of not only maintaining required performances such as storage stability and high-quality recording images, but also achieving a high redispersion property with reduced environmental pollution, effectively preventing nozzle clogging, and ensuring stable ejection by normal cleaning both during long continuous operation and after stopping the operation of an apparatus for a long time. Thus, the ink of the present invention is suitable for an ink for ink jet recording that uses a sublimation dye as a color component.

A sublimation transfer dyeing method of the present invention allows the ink for sublimation transfer ink jet recording to be printed by ink jet printing, followed by sublimation transfer. Thus, this method can reduce environmental pollution while maintaining required performances such as storage stability and high-quality recording images of the ink used for dyeing. Therefore, the ink used can improve the redispersion property and effectively prevent nozzle clogging, which makes it possible to perform dyeing all the time and to ensure stable ejection by normal cleaning both during long continuous operation and after stopping the operation of an apparatus for a long time. Thus, the method of the present invention is suitable for ink jet printing that uses ink for sublimation transfer ink jet recording.

The invention claimed is:

1. An ink for sublimation transfer ink jet recording comprising:
    water;
    at least one sugar alcohol containing not less than four OH groups;
    a sublimation dye;
    a dispersant; and
    a compound expressed by the following chemical formula (I):

$$R\text{—}O\text{—}(CH_2CH_2O)_n\text{—}H \qquad (I)$$

where R is an alkyl group having a carbon number of 25 to 150 and n is from 2 to 100.

2. The ink for sublimation transfer ink jet recording according to claim 1, wherein the sugar alcohol containing not less than four OH groups is at least one selected from the group consisting of D-sorbitol, xylitol, and maltitol.

3. The ink for sublimation transfer ink jet recording according to claim 1, wherein R is an alkyl group having a carbon number of 30 to 50 and n is from 10 to 50 in the chemical formula (I).

4. The ink for sublimation transfer ink jet recording according to claim 1, wherein hydrophile-lipophile balance (HLB) of the compound expressed by the chemical formula (I) is not less than 10.

5. The ink for sublimation transfer ink jet recording according to claim 1, wherein the sublimation dye is at least one selected from the group consisting of a disperse dye and a solvent dye.

6. The ink for sublimation transfer ink jet recording according to claim 1, wherein the dispersant is at least one selected from the group consisting of an anionic surfactant, a nonionic surfactant, and a high-molecular surfactant.

7. The ink for sublimation transfer ink jet recording according to claim 1, wherein an amount of the sugar alcohol containing not less than four OH groups is 0.5 to 50 wt % with respect to a total weight of ink.

8. The ink for sublimation transfer ink jet recording according to claim 1, wherein an amount of the sugar alcohol containing not less than four OH groups is 0.5 to 50 wt %, an amount of the sublimation dye is 0.2 to 12 wt %, an amount of the dispersant is 0.1 to 20 wt %, and an amount of the compound expressed by the chemical formula (I) is 0.1 to 8 wt % with respect to a total weight of ink.

9. The ink for sublimation transfer ink jet recording according to claim 1, wherein the ink does not substantially include a water-soluble organic solvent.

10. A sublimation transfer dyeing method comprising:
printing the ink for sublimation transfer ink jet recording according to any one of claims 1 to 9 on a sheet medium by ink jet printing; and
heating the sheet medium to sublimate and transfer the sublimation dye onto an object to be dyed.

11. A method for producing the ink for sublimation transfer ink jet recording according to claim 1, comprising:
pulverizing a predispersion containing at least water, a dispersant, and a sublimation dye so that the sublimation dye is formed into fine particles with an average particle size of 0.05 to 0.2 μm; and
thereafter, adding sugar alcohol containing not less than four OH groups, the compound expressed by the chemical formula (I), and water, thereby adjusting an ink concentration.

12. The method according to claim 11, wherein the predispersion further includes the compound expressed by the chemical formula (I).

* * * * *